United States Patent [19]

Takasaka

[11] Patent Number: 5,054,571
[45] Date of Patent: Oct. 8, 1991

[54] OIL TANK DEVICE FOR MOTORCYCLE

[75] Inventor: Masao Takasaka, Hamamatsu, Japan

[73] Assignee: Suzuki Jidosha Kogyo Kabushiki Kaisha, Shizuoka, Japan

[21] Appl. No.: 468,504

[22] Filed: Jan. 23, 1990

[30] Foreign Application Priority Data

Jan. 31, 1989 [JP] Japan .................................. 1-21156

[51] Int. Cl.⁵ ........................................... G62K 11/08
[52] U.S. Cl. .................................... 180/219; 180/225;
280/835; 280/281.1; 138/89; 138/172
[58] Field of Search ...................... 180/219, 225, 69.4;
280/201, 274, 281.1, 288.2, 288.3, 831, 831, 835;
215/296; 138/172, 89, 89.4, 108, 177

[56] References Cited

U.S. PATENT DOCUMENTS

| 1,386,354 | 8/1921 | Owen .................... 180/225 |
| 1,978,653 | 10/1934 | Smith .................... 280/274 |
| 2,336,397 | 10/1943 | Harrington .......... 138/172 |
| 3,051,343 | 8/1962 | Pappas ................. 215/296 |
| 4,461,489 | 7/1984 | Tsukiji et al. ........ 180/225 |
| 4,513,786 | 4/1985 | Sodergren et al. ... 138/89 |

FOREIGN PATENT DOCUMENTS

| 0229579 | 7/1987 | European Pat. Off. ....... 280/281.1 |
| 0120622 | 1/1931 | Fed. Rep. of Germany ...... 180/219 |
| 0502441 | 5/1920 | France ............... 280/281.1 |
| 0969812 | 12/1950 | France ............... 180/225 |
| 0275290 | 11/1989 | Japan ................. 180/219 |
| 0005006 | of 1903 | United Kingdom ...... 180/219 |
| 0463815 | 4/1937 | United Kingdom ...... 280/281.1 |
| 0517604 | 2/1940 | United Kingdom ...... 180/225 |

Primary Examiner—Charles A. Marmor
Assistant Examiner—Anne Marie Boehler
Attorney, Agent, or Firm—Schwartz & Weinrieb

[57] ABSTRACT

An oil tank device mounted upon the body frame of a motorcycle provided with a head pipe and other frame members for storing engine oil therein comprises a tank rail connected to the head pipe and provided with an inner hollow portion, a down tube connected to the head pipe so as to extend downwardly and also encompass an inner hollow portion, a bridge frame connected to the tank rail and down tube and provided with an inner hollow portion, and front reinforcements connected to both bilateral sides of the tank rail. The down tube and the bridge frame partially define an inner space between the front reinforcements and the inner space formed by means of front reinforcements communicates with the respective inner hollow portions of the tank rail, the down tube and the bridge frame. The lower end portions of the tank rail and the down tube have wall thicknesses which are gradually increased in the downward direction. The frame members of the body frame are welded at the most thickened portions of the lower portions thereof.

6 Claims, 6 Drawing Sheets

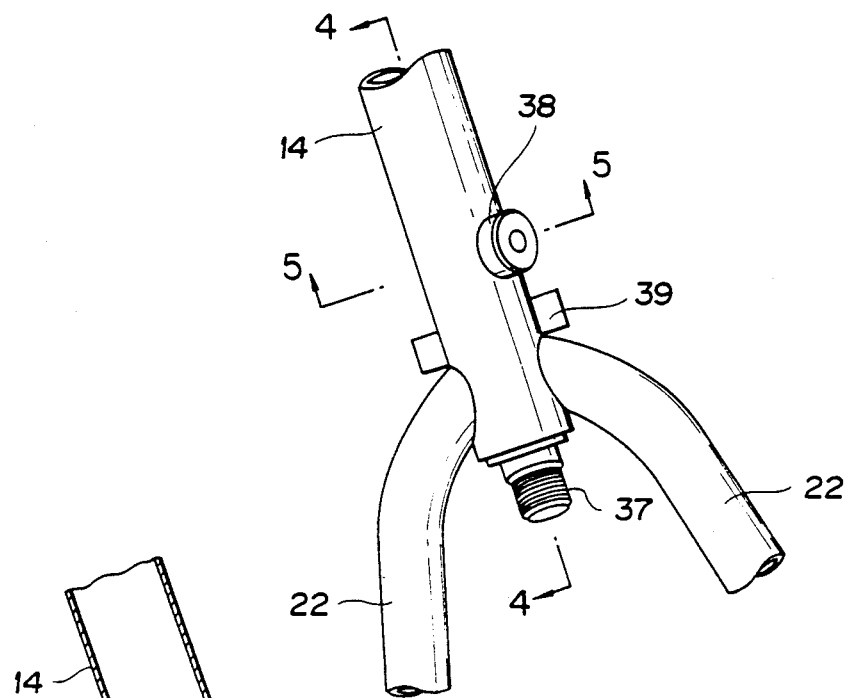
FIG. 3
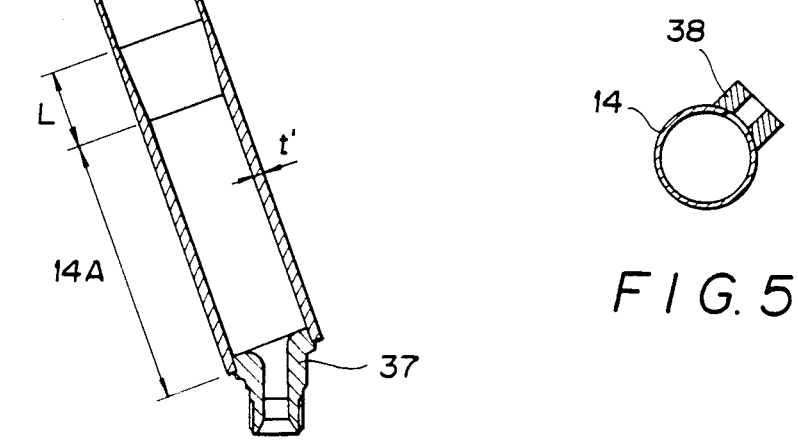
FIG. 4
FIG. 5

OIL TANK DEVICE FOR MOTORCYCLE

FIELD OF THE INVENTION

This invention relates to an oil tank device for a motorcycle utilizing internal cavities of components of frame members for an oil tank, which constitute a body frame of the motorcycle.

BACKGROUND OF THE INVENTION

A certain type of motorcycle is equipped with an oil tank device and a conventional oil tank device is provided with an oil tank disposed within vicinity of the head pipe of the body frame.

Engine oil is stored within such an oil tank and fed to respective portions constituting an engine unit so as to lubricate the same. The oil tank is constituted by means of the respective internal cavities of a front rail, a down tube and a bridge tube connecting the tank rail and the down tube and by means of a space defined between two reinforcements secured to both sides of the front tank rail, the down tube and the bridge tube.

An oil passage joint is welded to the lower end portion of the down tube and a rear tank rail is also welded to the lower portion of the front tank rail through means of an oil stopper joint. With the oil tank device described above, however, the difference between the wall thickness of the down tube and the oil passage joint is remarkably large, for example, and since those portions at which the wall thickness difference exists between the down tube and the oil passing joint is not gradually changed when the lower tubes or the like members are welded to the oil passage joint, stress may be concentrated at the welded portion of the oil passage joint.

OBJECT OF THE INVENTION

An object of this invention is to substantially eliminate the defects or drawbacks encountered by means of the conventional technology of this art field and to provide an oil tank device which is capable of sufficiently reducing the stress concentration developed at the body frame of the motorcycle during fabrication of the oil tank.

SUMMARY OF THE INVENTION

The foregoing and other objects can be achieved according to this invention by providing an oil tank device mounted upon the body frame of a motorcycle which is provided with a head pipe and other frame members for storing engine oil therein, and wherein the device comprises a tank rail which is connected to the head pipe and provided with an inner hollow portion, a down tube which is connected to the head pipe so as to extend downwardly and provided with an inner hollow portion, a bridge frame which is connected to the tank rail and down tube and provided with an inner hollow portion, and front reinforcements which are connected to both bilateral sides of the tank rail, the down tube and the bridge frame so as to define an inner space between the front reinforcements, the inner space formed by means of this front reinforcements communicating with the respective inner hollow portions of the tank rail, the down tube and the bridge frame, the lower end portions of the tank rail and the down tube having wall thicknesses which are gradually increased as one proceeds downwardly, and the frame members of the body frame being welded at the most thickened portions of the lower end portions thereof.

According to the oil tank device of the character described above, the lower end portions of the tank rail and the down tube have wall thicknesses which are gradually increased as one proceeds downwardly and, hence, when the frame members of the body frame are welded at the most thickened portions of the lower end portions thereof, the wall thicknesses formed so as to be gradually increased can considerably reduce the stress caused by means of the welding, for example, thereby remarkably reducing the stress concentration upon to the tank rail and down tube by means of the welding process.

BRIEF DESCRIPTION OF THE DRAWINGS

Various other objects, features, and attendant advantages of the present invention will become better understood from the following detailed description, when considered in connection with the accompanying drawings, in which like reference characters designate like or corresponding parts throughout the several views, and wherein:

FIG. 3 is a view taken along the arrowed direction A shown in FIG. 1;

FIG. 4 is a sectional view taken along the line 4—4 in FIG. 3;

FIG. 5 is a sectional view taken along the line 5—5 in FIG. 3;

DESCRIPTION OF THE PREFERRED EMBODIMENTS

In advance of the detailed description of a preferred embodiment construction according to this invention, a conventional oil tank device will be described hereunder with reference to FIGS. 10 to 13 for a better understanding of this invention.

Figure 10:
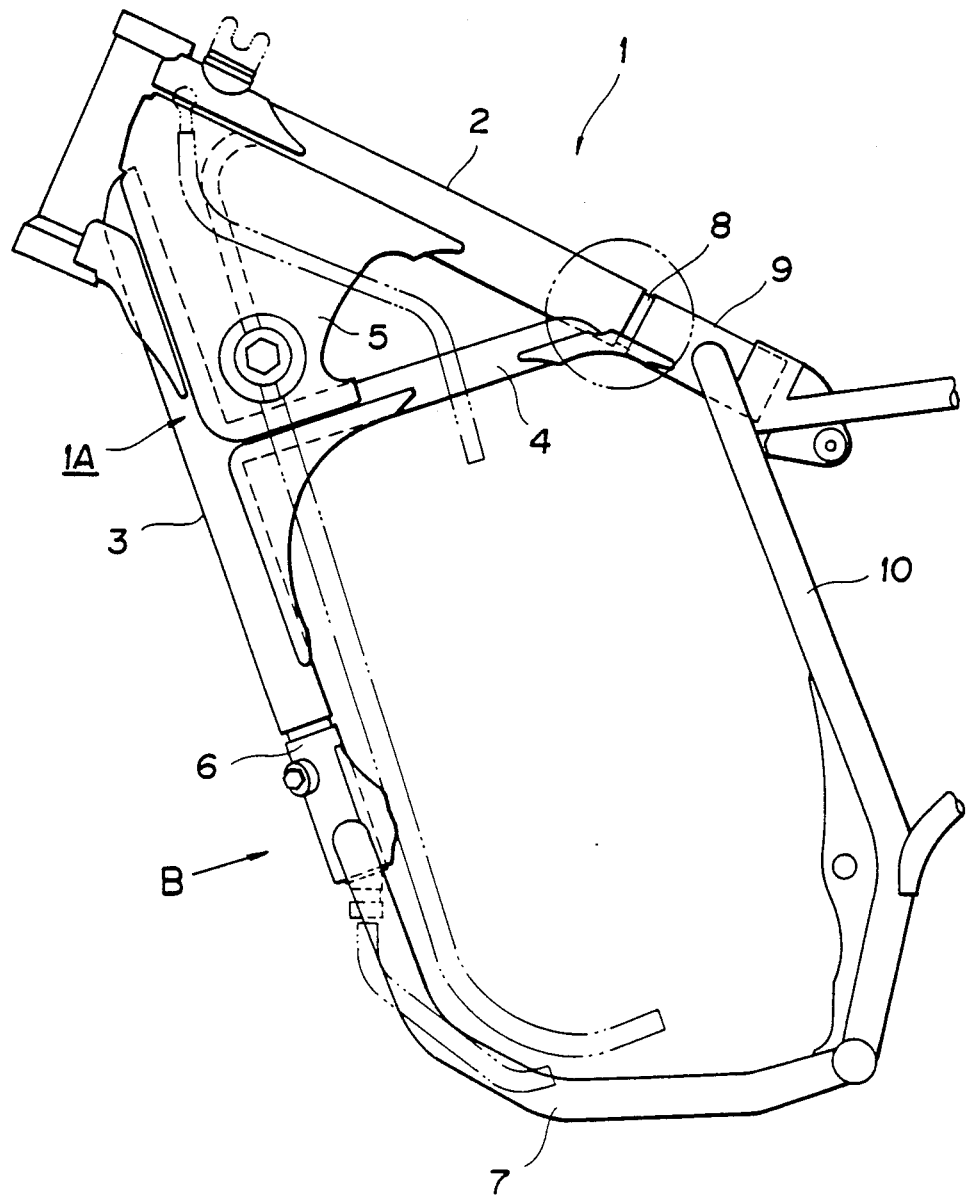
FIG. 10 is a partial side view of the body frame of a conventional oil tank device.

Referring to FIG. 10 showing a body frame of a motorcycle utilized for a conventional oil tank device, this conventional oil tank device is provided with an oil tank 1A disposed within the front portion of the body frame 1. Namely, the oil tank 1A is constituted by means of internal cavities of a front tank rail 2, a down tube 3 and a bridge frame 4 connecting the tank rail 2 and the down tube 3 and by means of a space defined between two reinforcements 5 secured to both sides of the front tank rail 2, the down tube 3 and the bridge frame 4.

Engine oil is stored within the oil tank 1A having the structure described above is positively fed to respective portions of the engine unit so as to lubricate the same.

Figure 11:
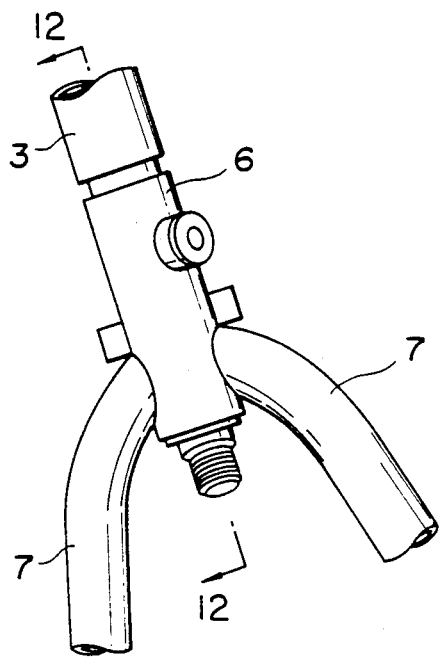
FIG. 11 is a view taken along the arrowed direction B in FIG. 10.

An oil passage joint 6 is produced by forging means, for example, and is connected to the lower end portion of the down tube 3, and lower tubes 7 are welded to both sides of the joint 6 as shown in FIG. 11. Referring again to FIG. 10, a rear tank rail 9 is welded to the lower portion of the front tank rail 2 through means of an oil stopper joint 8, and side frames 10 coupled to the lower tubes 7 are welded to the rear tank rail 9. The oil stopper joint 8 is manufactured by forging means and is disposed as an end stopper member for the oil tank portion of the front tank rail 2.

Figure 12:
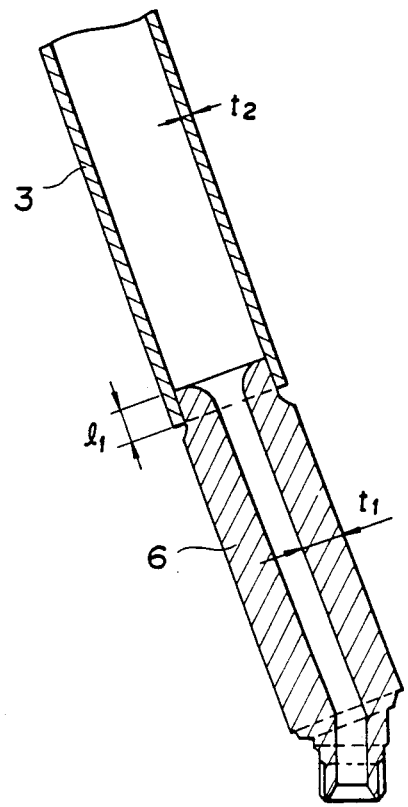
FIG. 12 is a sectional view taken along the line 12—12 in FIG. 11.

Referring to FIG. 12, the wall thickness $t_1$ of the oil passage joint 6 is thicker than the wall thickness $t_2$ of the down tube 3, and the oil passage joint 6 and the down tube 3 are connected at respective ends thereof in an overlapped fashion at which the difference between the thicknesses $t_1$ and $t_2$ is changed substantially suddenly, such hereinafter being called the thickness changing portion. The thickness changing portion has an axial length $l_1$ which is very short within the conventional structure. Accordingly, these thicknesses $t_1$ and $t_2$ rapidly change within this thickness changing portion and, hence, when the down tube 3 and the lower tube 7 are welded to the oil passage joint 6, severe stress concentration will be caused at the welded portions between the joint 6 and the down tube 3 and between the joint 6 and each of the lower tubes 7.

Figure 13:
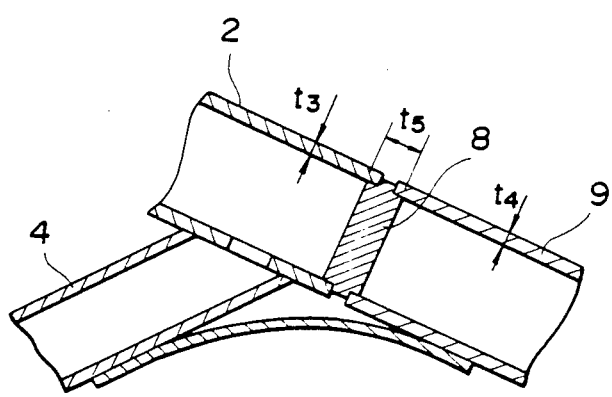
FIG. 13 is an enlarged sectional view of the portion enclosed by means of the chain line circle illustrated in FIG. 10.

Referring to FIG. 13, the rear tank rail 9 has a wall thickness $t_4$ which is thicker than that $t_3$ of the front tank rail 2. The oil stopper joint 8 is solid and has a considerably large wall thickness of $t_5$ as shown in FIG. 13, so that the differences in the wall thicknesses between those $t_3$ and $t_5$ of the front tank rail 2 and the stopper 8, and between those $t_4$ and $t_5$ of the rear tank rail 9 and the stopper 8 are considerably large. Moreover, as is shown in FIG. 13, there is no provision of a thickness changing portion between the front tank rail 2, the rear tank rail 9 and the oil stopper joint 8. According to the construction described above, severe stress concentration will therefore be developed at the welded portions defined between the rear tank rail 9, the front tank rail 2 and the oil stopper joint 8, between the bridge frame 4 and the front tank rail 2, and between the rear tank rail 9 and the side frame 10.

This invention was therefore conceived so as to substantially eliminate the defects of the prior art described above and will be described hereinbelow with reference to FIGS. 1 to 9.

Figure 1:
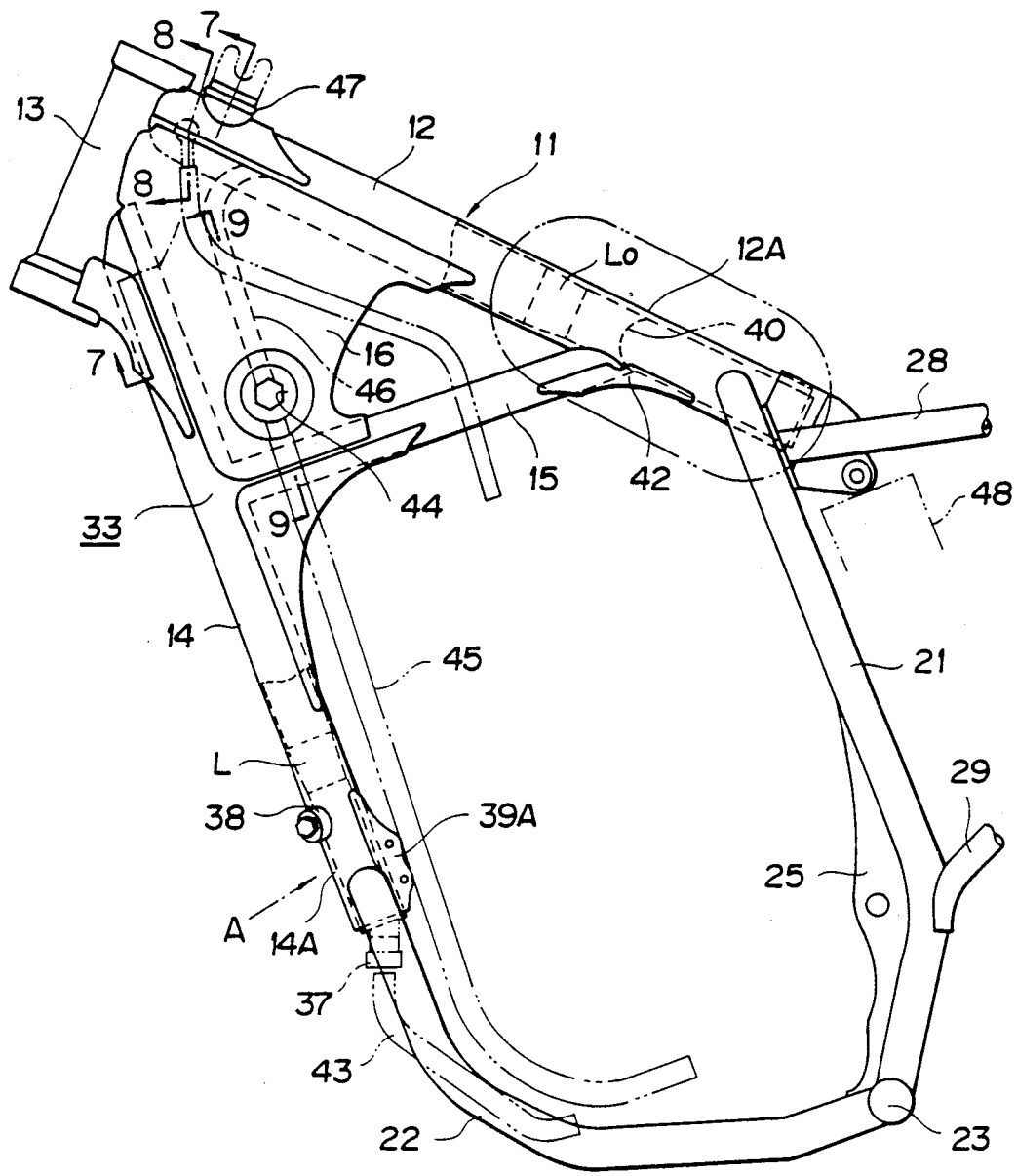
FIG. 1 is a partial side view of a body frame of a motorcycle according to one embodiment of this invention.
Figure 2:
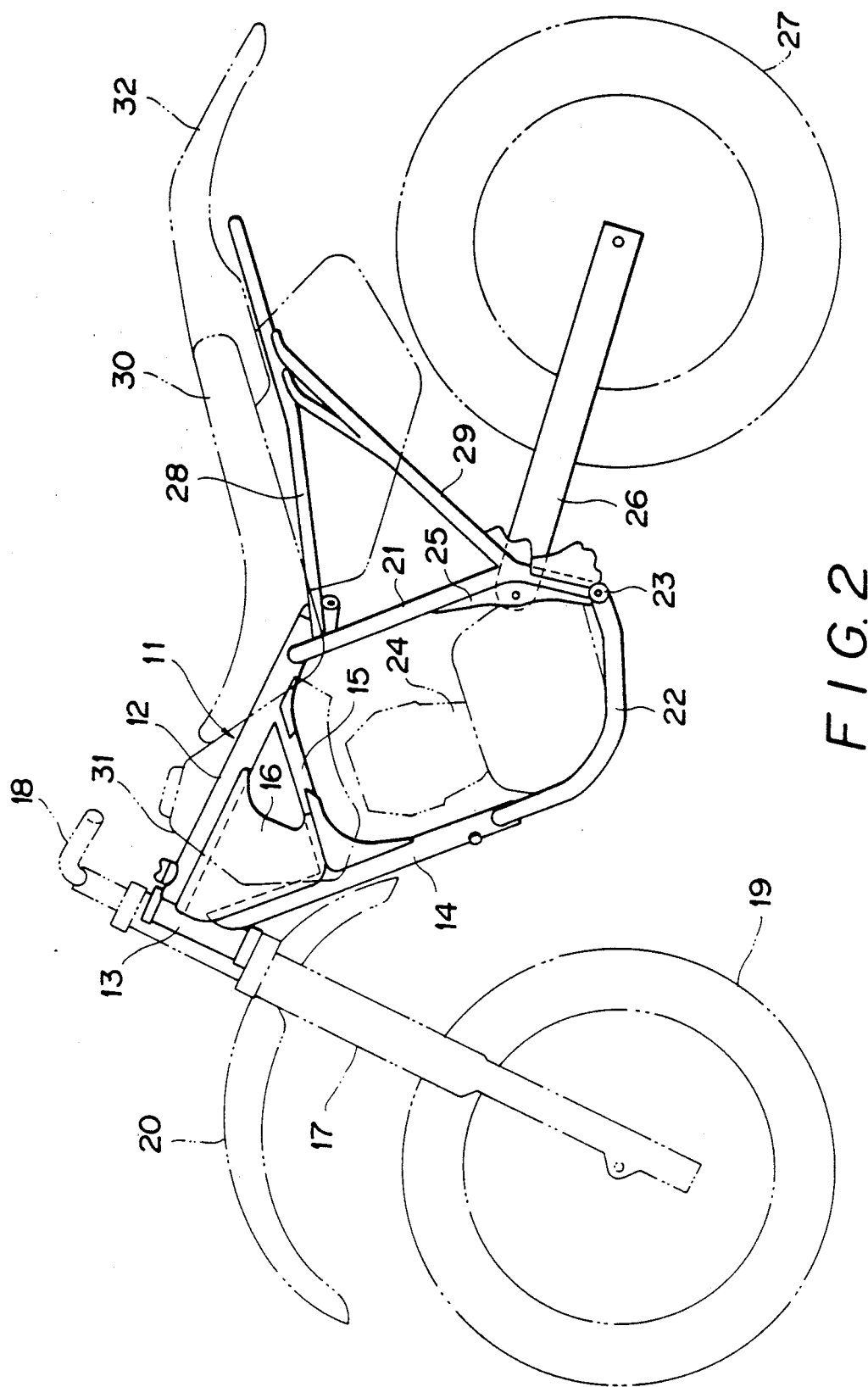
FIG. 2 is a side view of a motorcycle comprising the body frame shown in FIG. 1.

Referring to FIG. 2 showing a side view of a motorcycle comprising a body frame 11, which is shown in detail in FIG. 1, the body frame 11 is provided with a tank rail 12 which is fixed to the head pipe 13, and a down tube 14 which is connected to the head pipe 13 and extends downwardly within the body frame 11. A bridge frame 15 is coupled with the tank rail 12 and the down tube 14 so as to connect them, and front reinforcements 16 are welded to the head pipe 13, the tank rail 12 and the down tube 14, whereby the portion around the head pipe 13 is strengthened so as to increase the rigidity thereof. A front fork 17 is pivotally attached at the head pipe 13 through means of a steering shaft, not shown, so as to be swingable bilaterally with respect to the body frame 11. A handle bar 18 is secured at the top portion of the front fork 17 and a front wheel 19 is rotatably mounted at the lower end portion of the front fork 17. Reference numeral 20 in FIG. 2 designates a front fender.

A pair of side frames 21 are secured upon bilateral side portions of the end portion of the tank rail 12 and a pair of lower tubes 22 are fixedly mounted upon bilateral sides of the end portion of the down tube 14. The rear portion of each lower tube 22 is fixed to the lower portion of each side frame 21 respectively through means of a cross member 23. An engine unit 24 is mounted within a space enclosed by means of the bridge frame 15, the down tube 14, the lower tubes 22 and the side frames 21. A swing arm 26 is supported by means of a swing arm pivot portion 25, as seen in FIG. 2, which is secured to the side frames 21, to so as be swingable with respect to the motorcycle body. A rear wheel 27 is rotatably supported at the free end portion of the swing arm 26. A pair of seat rails 28 fixed at the upper end portions of the side frames 21 extend rearwardly of the body frame 11 and are supported by means of a pair of seat pillars 29. A seat 30 is mounted upon the seat rails 28, and a fuel tank 31 is arranged above the tank rail 12. Reference numeral 32 in FIG. 2 designates a rear fender.

Figure 7:
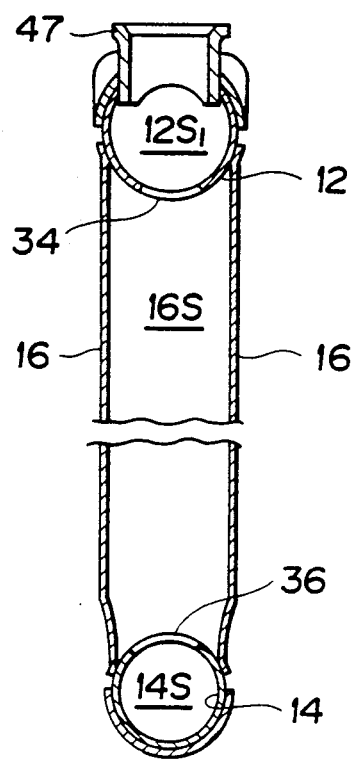
FIGS. 7, 8 and 9 are sectional views taken along the lines 7—7, 8—8, and 9—9 in FIG. 1, respectively.
Figure 8:
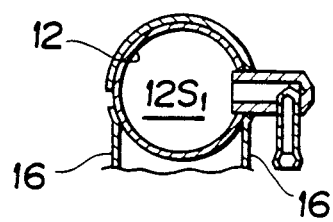
Figure 9:
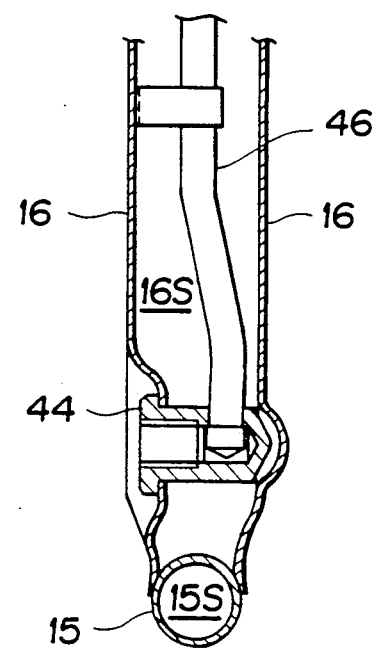

Front reinforcements 16 represented on an enlarged scale in FIG. 1 are welded to the bilateral sides of the tank rail 12, the down tube 14 and the bridge frame 15, as shown in FIGS. 7 to 9, so as to thereby define an inner space 16s. The tank rail 12, the down tube 14 and the bridge frame 15 have tubular or pipe type structures with inner spaces $12s_1$, $14s$ and $15s$ respectively. An oil tank compartment 33 is formed by fluidically connecting the inner space 16s of the reinforcements 16 with respective inner spaces $12s_1$, $14s$ and $15s$ of the tank rail 12, the down tube 14 and the bridge frame 15.

Figure 6:
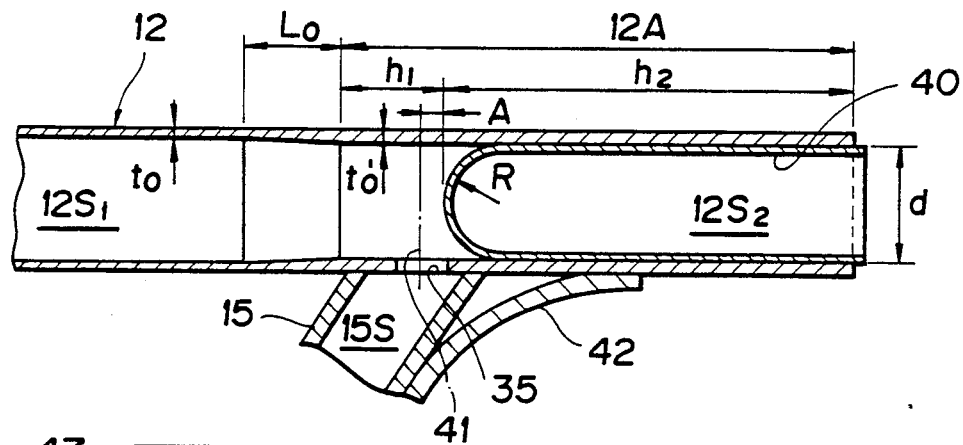
FIG. 6 is an enlarged sectional view of the portion enclosed by means of the chain line oval illustrated in FIG. 1.

Namely, an opening 34 shown in FIG. 7 is formed within the lower side of the upper end portion of the tank rail 12 shown in FIG. 1 to so as to fluidically connect the inner space $12s_1$ with the inner space 16s, and an opening 35 is formed, as shown in FIG. 6, in the lower side of the lower portion of the tank rail 12 to so as to fluidically connect the inner space $12s_1$ with the inner space 15s. An upper opening 36 shown in FIG. 7 and a lower opening, not shown, are respectively formed within upper and lower portions of the section at which the reinforcements 16 are welded to the down tube 14 as shown in FIG. 1, so that the inner space $14s$ communicates with the inner space 16s. An opening, not shown, similarly formed at the joint of the down tube 14 and the bridge frame 15 so as to establish communication between the inner space $14s$ and the inner space 15s, and an opening, not shown, is also formed at the welded section of the bridge frame 15 to which front reinforcements 16 are welded so as to thereby establish communication between the inner space 15s and the inner space 16s. As described, the oil tank compartment 33 is defined by means of by the communication established between the inner space 16s and the inner spaces $12s_1$, $14s$ and $15s$.

Referring to FIG. 4, the down tube 14 has a wall thickness t along a first axial portion thereof, but has a thickness t' (t' > t) at the lower end portion 14A thereof which renders the wall structure at that portion substantially thick.

A thickness changing portion represented by means of the dimension L in FIG. 4 is formed in such a manner that the difference between the wall thickness t and t' is gradually and smoothly reduced. An oil passage joint 37 having a relatively short axial length is welded at the lower end portion 14A of the down tube 14 and, as shown in FIG. 3, an oil drain bolt connection 38, an engine suspension boss 39 and the lower tubes 22 are welded at the same portion 14A. An engine suspension reinforcement 39A is also welded to the same portion 14A as shown FIG. 1.

Referring to FIG. 6, the tank rail 12 has a wall thickness $t_0$ at a first axial portion thereof but has a thickness $t'_0(t'_0 > t_0)$ at the lower end portion 12A of the tank rail 12, which renders the wall structure at that portion. A thickness changing portion relatively thick represented by means of the dimension $L_0$ is formed in such a manner that the difference between the wall thicknesses $t_0$ and $t'_0$ is gradually and smoothly reduced.

An oil stopper 40 provided with a semi-spherical head is inserted upwardly into the lower end portion 12A of the tank rail 12, and is welded to the distal end portion of the lower end portion 12A, thereby defining an oil tank portion, corresponding to the inner space $12s_1$ of the tank rail 12, and another portion as a non oil tank portion $12s_2$ within the tank rail 12. In the case that the outer diameter of the oil stopper 40 is represented by means of the value d, the radius R of the semi-spherical head of the oil stopper 40 is expressed as R=d/2. The oil stopper 40 is so arranged that the top portion of the semi-spherical head of the oil stopper 40 corresponds to the central axis 41 of the opening 35, or is spaced by means of a distance A from the axis 41.

With the lower end portion 12A of the tank rail 12 having the structure described above, each side frame 21 is, as shown in FIG. 1, welded to the insert portion of tank rail 12, which is represented so as to have a dimension $h_2$, into which the oil stopper 40 is inserted, and the bridge tube 15 is welded to the non-inserted portion, which is represented so as to have a dimension $h_1$, into which the oil stopper 40 is not inserted. A reinforcement 42 is also welded to the insert portion $h_2$ so as to reinforce the joint between the bridge tube 15 and the tank rail 12.

An oil inlet port 47 is mounted upon the upper portion of the tank rail 12 as seen in FIG. 7 and an oil pump inlet hose 43 connected to a feed pump, not shown, is coupled to the oil passage joint 37, while an oil outlet hose 45 connected to a scavenge pump, not shown, is coupled to an oil return port 44 of the front reinforcement 16. As shown in FIG. 9, an oil hose 46 is connected to the oil return port 44 within the inner space $16s$ of the front reinforcement 16, that is within the oil tank compartment 33, and extends upwardly so as to communicate with the inner space $12s_1$ of the tank rail 12.

When the feed pump and the scavenge pump are driven, engine oil stored within the oil tank compartment 33 is fed to the respective portions of the engine unit 24, including the piston thereof, through means of the oil pump inlet tube 43 as a result of the operation of the feed pump, whereby the oil lubrication can be established at the respective portions of the engine unit 24. The lubricating oil is deposited upon the bottom portion of an oil pan, not shown, and then scavenged and fed into the oil tank compartment 33 through means of the oil pump outlet hose 45 as a result of the operation of the scavenge pump. The lubricating oil is then introduced into the inner space $12s_1$ of the tank rail 12 through means of the oil hose 46. The engine oil within the inner space $12s_1$ flows down into the inner space $16s$ through means of the opening 34 and, simultaneously, into the inner space $15s$ through means of the opening 35. The engine oil within the inner space $16s$ then flows into inner space $14s$ through means of the upper opening 36 and the lower opening, not shown, and, simultaneously, into the inner space $15s$ through means of another opening, not shown. The engine oil within the inner space $15s$ is also introduced into the inner space $14s$ through means of an opening, not shown. During this flow of the engine oil, the engine oil can be substantially cooled.

According to the described embodiment, the thickness changing portion L, as shown in FIG. 4, is formed in such a manner that the difference between the wall thicknesses t and t' of the down tube 14 is gradually and smoothly reduced and, hence, when the oil passage joint 37, the oil drain bolt connection 38 and the lower tubes 22 are welded to the lower end portion 14A of the down tube 14, the thickness changing portion L can considerably reduce the stress caused by means of the welding operation. The thickness changing portion $L_0$ shown in FIG. 6 is formed in such a manner that the difference between the wall thicknesses $t_0$ and $t'_0$ of the tank rail 12 is gradually and smoothly reduced, and, hence, when the side frames 21 and the bridge frame 15 are welded to the lower end portion 12A of the tank rail 12, the thickness changing portion $L_0$ can considerably reduce the stress caused by means of welding operation.

Accordingly, the stress concentration conventionally developed within the tank rail 12 and the down tube 14 by means of the welding operation can be remarkably reduced.

As shown in FIG. 6, the head of the oil stopper 40 is formed with a semi-spherical shape, so that this semi-spherical head of the stopper 40 can reduce weaken the stress caused at the portion, represented by means of the dimension A, of the lower end portion 12A of the tank rail 12, thus preventing severe stress concentration within the portion represented by means of the dimension A.

In addition, the wall thickness of the lower end portion 12A of the tank rail 12 is effectively increased as a result of the insertion or presence of the oil stopper 40 within the end portion 12A, thus considerably improving the rigidity of the portion 12A against external forces and oscillation from a rear cushion unit 48 shown in FIG. 1 and the side frames 21.

Moreover, the oil passage joint 37 welded to the lower portion 14A of the down tube 14 is designed to be smaller than the conventional oil passage joint 6, shown in FIG. 12, thereby reducing the manufacturing cost as well as the body weight.

It is to be understood that this invention is not limited to the described embodiments and many other modifications and changes may be made without departing from the scope and spirit of present invention as embodied within the appended claims.

What is claimed is:

1. An oil tank device for storing engine oil therein, mounted upon a body frame of a motorcycle which is provided with a head pipe for mounting a front wheel fork of said motorcycle, and frame members for mounting an engine of said motorcycle, comprising:

a tank rail connected to said head pipe and formed as a tubular member which is provided with an inner hollow portion and a lower end portion;

a down tube connected to said head pipe so as to extend downwardly therefrom, and which is formed as a tubular member which is provided with an inner hollow portion and a lower end portion;

a bridge frame connected to said tank rail and said down tube and which is formed as a tubular member which is provided with an inner hollow portion;

front reinforcements connected to bilateral sides of said tank rail, said down tube, and said bridge frame so as to define an inner space between said front reinforcements;

said lower end portions of said tank rail and said down tube having wall thicknesses which gradually increase in the downward direction so as to permit said frame members of said body frame to be welded at the thickest portions of said lower end portions thereof so as to substantially eliminate stress forces impressed upon said frame members, said tank rail, and said down tube by means of welding operations; and means, comprising oil passageways, for fluidically connecting said inner space formed between said front reinforcements with said respective inner hollow portions of said tank rail, said down tube, and said bridge frame, provided within said thickest portions of said lower end portions of said tank rail and said down tube so as to prevent weakness within said tank rail and said down tube when said oil passageways are formed within said tank rail and said down tube.

2. An oil tank device according to claim 1, wherein said lower end portion of the tank rail is provided with an oil stopper inserted into the lower end portion thereof, which defines an oil tank portion and another portion formed as a non oil tank portion in the tank rail.

3. An oil tank devide according to claim 2, wherein a head portion of said oil stopper is formed with a semi-spherical shape.

4. An oil tank device as set forth in claim 3, wherein:
said oil passageway formed within said tank rail is formed within said oil tank portion of said tank rail.

5. An oil tank device as set forth in claim 4, wherein:
said semi-spherical head portion of said oil stopper is disposed at a predetermined distance from said oil passageway formed within said oil tank portion of said tank rail.

6. An oil tank device according to claim 1, wherein an oil passage joint is coupled to an end portion of the down tube.

* * * * *